US006794988B1

(12) United States Patent
Weiss et al.

(10) Patent No.: US 6,794,988 B1
(45) Date of Patent: Sep. 21, 2004

(54) CONTROL DEVICE FOR A MOTOR VEHICLE

(75) Inventors: Karl-Ernst Weiss, Ettlingen (DE); Roderick Pettit, Wantirna South (AU)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/831,743

(22) PCT Filed: Oct. 20, 1999

(86) PCT No.: PCT/DE99/03355

§ 371 (c)(1), (2), (4) Date: Aug. 7, 2001

(87) PCT Pub. No.: WO00/28177

PCT Pub. Date: May 18, 2000

(30) Foreign Application Priority Data

Nov. 11, 1998 (DE) ........................................ 198 51 950

(51) Int. Cl.[7] ................................................ G05B 19/00

(52) U.S. Cl. ........................ 340/553; 340/5.64; 340/5.8; 340/5.82; 340/5.83; 340/825.69; 340/382; 340/124; 340/126; 340/70; 340/63; 340/278.2; 340/278.3; 340/370; 340/381

(58) Field of Search ............................... 340/5.53, 5.64, 340/5.8, 5.82, 5.83, 825.69, 5.26; 382/124, 126; 70/63, 278.2, 278.3, 370, 381

(56) References Cited

U.S. PATENT DOCUMENTS

| | | | | | |
|---|---|---|---|---|---|
| 5,701,770 | A | | 12/1997 | Cook et al. | |
| 6,043,752 | A | * | 3/2000 | Hisada et al. | 340/5.26 |
| 6,078,265 | A | * | 6/2000 | Bonder et al. | 340/5.23 |
| 6,100,811 | A | * | 8/2000 | Hsu et al. | 340/5.83 |
| 6,271,745 | B1 | * | 8/2001 | Anzai et al. | 340/5.53 |
| 6,614,920 | B2 | * | 9/2003 | Floyd | 382/124 |

FOREIGN PATENT DOCUMENTS

| | | |
|---|---|---|
| DE | 25 01 516 | 7/1976 |
| DE | 29 50 096 | 6/1981 |
| DE | 19842544 | 4/2000 |
| EP | 0 239 388 | 9/1987 |

OTHER PUBLICATIONS

*JP Patent Abstracts of Japan: JP 01 235783, Dec. 14, 1989.

*JP Patent Abstracts of Japan: JP 01 235783, Nov. 11, 1994.

*JP Patent Abstracts of Japan: JP 06 221039, Nov. 11, 1994.

* cited by examiner

*Primary Examiner*—Michael Horabik
*Assistant Examiner*—Yves Dalencourt
(74) *Attorney, Agent, or Firm*—Kenyon & Kenyon

(57) ABSTRACT

A control device for a motor vehicle having a fingerprint scanning surface via which a fingerprint sensor detects a fingerprint in the form of a fingerprint signal of a user. Motor vehicle functions can be released as a function of the fingerprint signal. The motor vehicle functions can also be released by a key. A control element is provided with the fingerprint scanning surface and a mechanical receptacle for the key.

7 Claims, 3 Drawing Sheets

CONTROL DEVICE FOR A MOTOR VEHICLE

FIELD OF THE INVENTION

The present invention relates to a control device for a motor vehicle. In particular, the control device can have a fingerprint scanning surface.

BACKGROUND INFORMATION

A conventional device for determining driving authorization is described in German Patent Application No. P 19842544.9. The user is granted access to the vehicle if he supplies proper identification either by an authorizing biometric signal or by an authorizing control means signal from a conventional control means, such as a transponder integrated into a key. However, German Patent Application No. P 19842544.9 does not describe how these two authorization release methods for the motor vehicle are to be designed in one control element.

SUMMARY OF THE INVENTION

The present invention provides a control device for a motor vehicle having a fingerprint scanning surface via which a fingerprint sensor detects a fingerprint in the form of a fingerprint signal of a user. The present invention also provides a control device for a motor vehicle having a mechanical receptacle for a key. Motor vehicle functions can be enabled as a function of the fingerprint signal. A key can also be used to enable the motor vehicle functions. The motor vehicle functions can be enabled in two ways: by a fingerprint that is recognized as valid or by a key that is recognized as valid. Only one control element is provided for both these alternative means of identification. The same control element can continue to perform the functions usually associated with a key for starting the motor vehicle and activating the vehicle power supply even if the fingerprint method of identification is used. Control can be carried out in the same manner, despite the two alternative means of identification.

According to an embodiment of the present invention, the control element has a rotatable and/or movable design for operating a switching means. The switching means can be used to activate motor vehicle functions such as “supply voltage on”, “engine on”, and “engine off”. Because the control element requires either the key to be inserted into its receptacle or the user to place a finger against the fingerprint scanning surface for authorization release to take place, subsequent activation of the control element can start the motor vehicle as part of a standard operation.

A further embodiment of the present invention provides a signal detector that detects a signal transmitted by the immobilizer transponder located in the key and is integrated into the control element. For example, an antenna can be used as the signal detector. This antenna receives a code transmitted by the key transponder for the purpose of checking authorization. If the key is in its receptacle, the proposed antenna arrangement can ensure secure code transmission.

In a further embodiment of the present invention, the fingerprint sensor can be structurally integrated into the control element. This allows the fingerprint sensor to be fixedly arranged opposite the fingerprint scanning surface, enabling secure input of the fingerprint signals.

In a further embodiment of the present invention, the fingerprint sensor can be fixedly arranged opposite the mobile control element. The fingerprint signal can be input only if the fingerprint scanning surface located on the control element is covered by the fingerprint sensor. If multiple fingerprint scanning surfaces are provided on the control element for multiple fingers, suitable movement of the control element can be used to input these fingerprint signals consecutively by covering the fingerprint scanning surfaces consecutively with the fingerprint sensor. This further embodiment of the present invention may require only one fingerprint sensor to evaluate multiple fingerprint signals simultaneously.

In a further embodiment of the present invention, the receptacle can be designed as a friction-locked and/or form-fitted connection with the key located in the receptacle so that moving the key also moves the control element. Because the control element also actuates the switching means, the user can use the key not only for identification, but also to activate the “power on” and “engine on” functions, respectively.

The embodiments of the present invention can further retain the conventional means of operation, while adding a fingerprint-based method of identification.

The present invention provides a combination key and fingerprint based identification in a single control element that allows installation of the single control element at the same location as a conventional ignition lock and allows the installation to be handled in a conventional manner.

In a further embodiment of the present invention, operating the control element mechanically locks and/or unlocks another control element. This additional control element can be, for example, a steering wheel lock. This embodiment allows a user to activate and deactivate a further function in the conventional manner using the control element.

A further embodiment of the present invention provides a locking means that suppresses the control element movement as a function of the fingerprint signal and/or the key signal. Certain functions such as “engine on” can be mechanically triggered only if the fingerprint signal identifies an authorized user or a valid key is used. This embodiment further increases security to prevent unauthorized persons from starting the motor vehicle.

In embodiments of the present invention, multiple fingerprint scanning surfaces can be provided on the control element. This provision can enable multiple fingerprint signals to be evaluated as proof of authorization. If only one valid fingerprint triggers release, the vehicle can still be started even if what is ordinarily the “first” fingerprint cannot be evaluated due to injury, an adhesive bandage or the like, thus avoiding the need to place the finger or hand in any other additional position.

DETAILED DESCRIPTION

Figure 1:
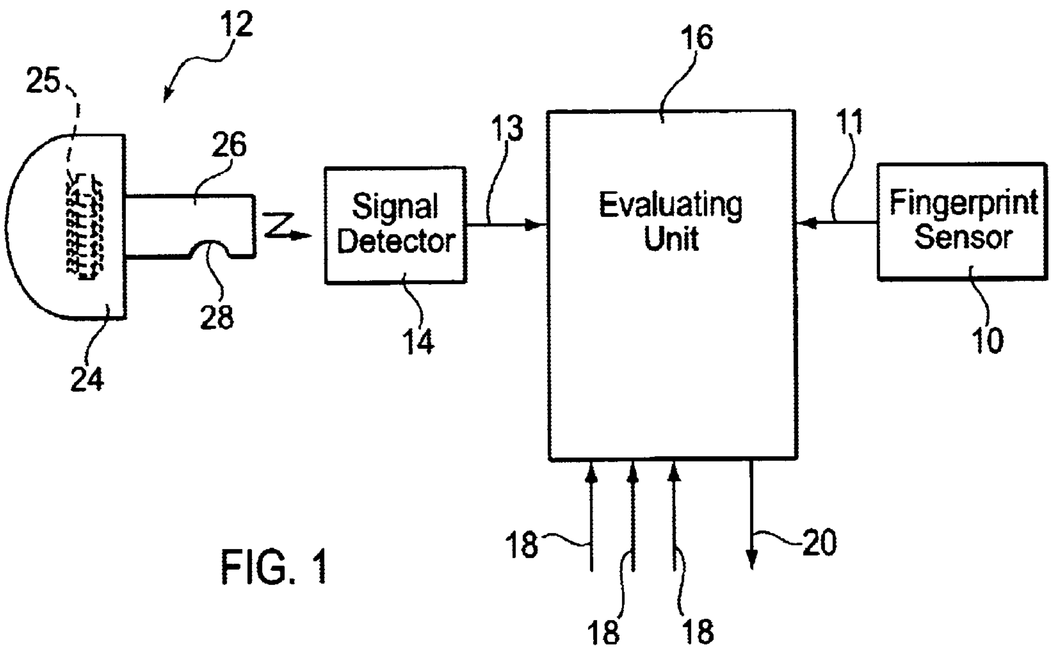
FIG. 1 shows a block diagram of an embodiment of the present invention.
Figure 2:
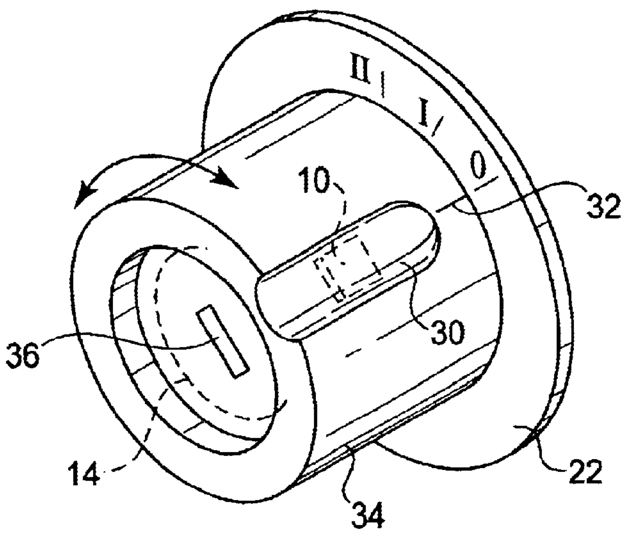
FIG. 2 shows a perspective view of an embodiment of the present invention.

Referring to FIGS. 1 and 2, a fingerprint signal 11 detected by a fingerprint sensor 10 is supplied to an evaluating unit 16. A signal detector 14 detects a signal from a transponder 25 in a key 12, with the signal being forwarded to evaluating unit 16 in the form of a key signal 13. Switching signals 18 are supplied to evaluating unit 16. Evaluating unit 16 emits a release signal 20. Key 12 includes a bow 24 and a driver 26, which has a recess 28, as well as a transponder 25.

Control element 34 is designed as a cylindrical body, allowing it to rotate around its axis with respect to armature 22. This makes it possible to move a mark 32 on control element 34 representing a position 0, I, and II of armature 22. A more or less finger-shaped recess is provided on the cylindrical surface of control element 34 as a fingerprint scanning surface 30. Next to fingerprint scanning surface 30 is fingerprint sensor 10 for detecting the fingerprint. A rectangular receptacle 36 for holding driver 26 of key 12 is provided in the circular surface of control element 24 indented in the direction of armature 22. Rectangular recess 28 is surrounded by circular signal detector 14 designed as an antenna.

Figure 3:
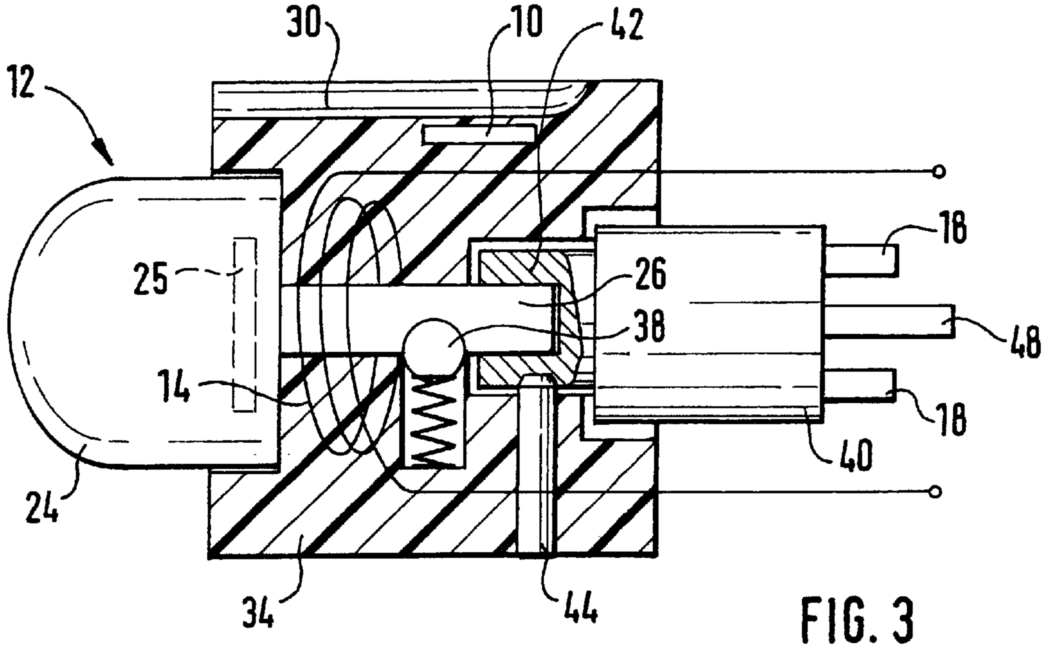
FIG. 3 shows a cross section view of an embodiment of the present invention.

Referring to FIG. 3, key 12 inserted into control element 34 is illustrated with a corresponding rotary switch 40. When key 12 is inserted, a disk-shaped locking device 38, which is movably connected to control element 34 by a spring, engages with recess 28. Rotary switch 40 is operated by a rotary switch shaft 42 that is mechanically coupled with driver 26 and/or control element 34. The friction-locked connection between control element 34 and rotary switch shaft 42 is established by a connecting pin 44. Rotary switch 40 has a rotary switch coupling 48 as well as taps for switching signals 18. FIG. 3 further shows that signal detector 14 can be designed as an antenna that surrounds driver 26. Fingerprint sensor 10, which is arranged next to fingerprint scanning surface 30, is integrated into control element 34.

Figure 4:
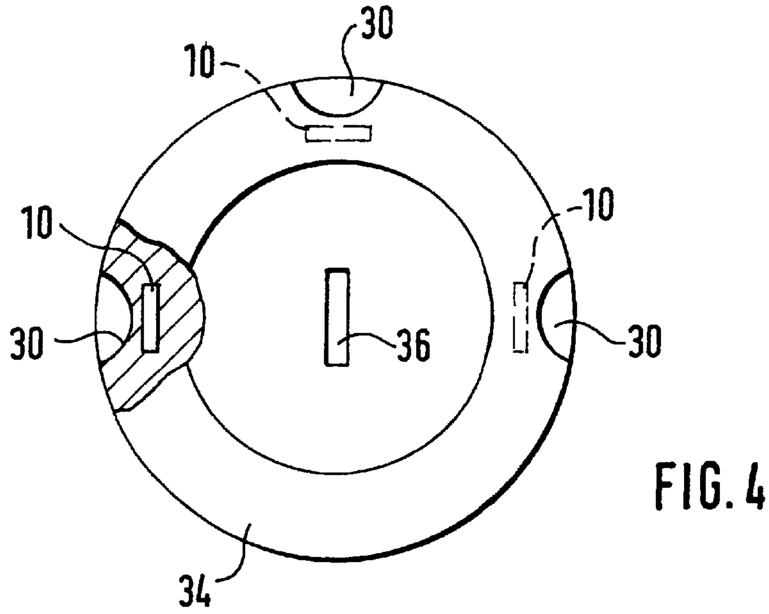
FIG. 4 shows a top view of an embodiment of the present invention.

Referring to FIG. 4, control element 34 has three fingerprint scanning surfaces 30, to each of which is assigned a fingerprint sensor 30. A rectangular receptacle 36 is integrated into control element 34.

Figure 5A:
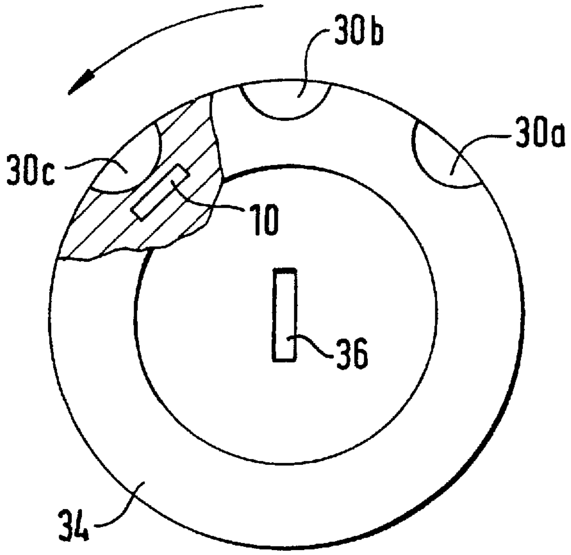
FIG. 5*a* shows a top view of an embodiment of the present invention.
Figure 5B:
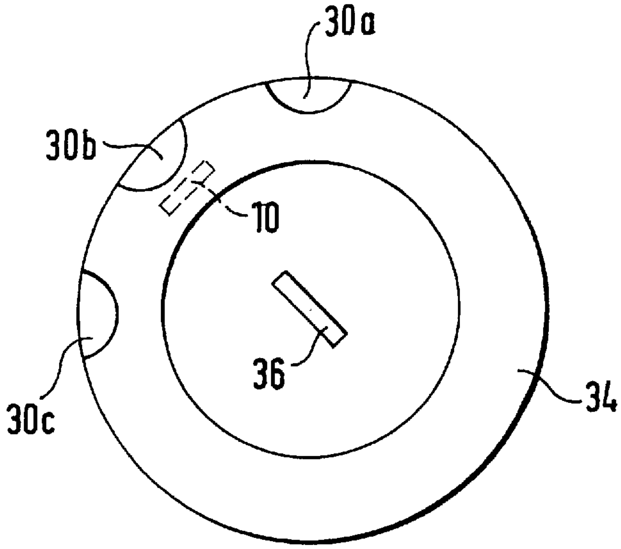
FIG. 5*b* shows a top view of an embodiment of the present invention.
Figure 5C:
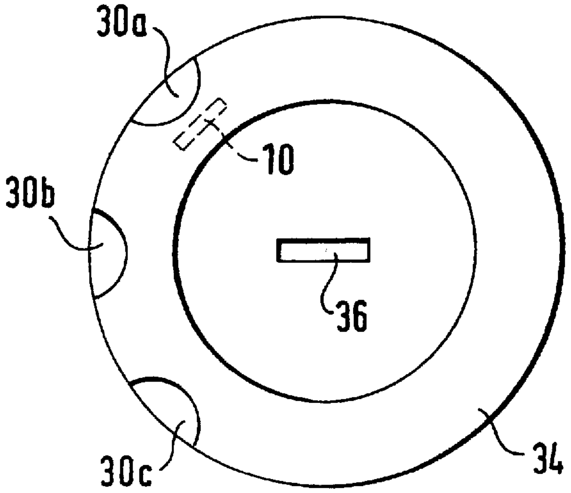
FIG. 5*c* shows a top view of an embodiment of the present invention.

Referring to FIGS. 5*a*–5*c*, control element 34 is shown in different operating states. Fingerprint sensor 10 in this embodiment is fixedly arranged opposite control element 34 and fingerprint scanning surfaces 30*a*–30*c*. In FIG. 5*a*, fingerprint sensor 10 detects the fingerprint of the finger located on third fingerprint scanning surface 30*c*. In FIG. 5*b*, fingerprint sensor 10 detects the fingerprint of the finger located on second fingerprint scanning surface 30*b*. In FIG. 5*c*, the fingerprint sensor 10 detects the fingerprint of the finger located on first fingerprint scanning surface 30*a*.

Evaluating unit 16 can emit an enable signal 20 if either fingerprint signal 11 or key signal 13 was identified as a valid signal. In the case of authorization release via key 12, the user can insert the key 12 into receptacle 36. A code that transponder 25 sends to signal detector 14, triggered by signal detector 14, can be stored in key 12. Signal detector 14 designed as an antenna forwards key signal 13 sent by key 12 to evaluating unit 16. The evaluating unit 16 compares incoming key signal 13 to a reference key signal stored as a valid signal. If the signals match, enable signal 20 is generated. Enable signal 20 can also be generated by inputting a fingerprint signal 11 detected by fingerprint sensor 10. To do this, the user can place a finger on fingerprint scanning surface 30 of control element 34. Fingerprint sensor 10 is located opposite fingerprint scanning surface 30 so that it detects the user's fingerprint capacitively, thermally or optically. Reference fingerprint signals can be stored in a corresponding memory in evaluating unit 16. If incoming fingerprint signal 11 matches one of these reference fingerprint signals, the user is assumed to be an authorized one, and enable signal 20 is generated. Enable signal 20 causes the controllers located in the motor vehicle to switch to enable so that the controllers can be placed in service. Switching signals 18 of rotary switch 40, which detect the position of control element 34, are also supplied to evaluating unit 16. If mark 32 is in position "0", the power supply and engine are turned off. In position "I", power is supplied to the loads. In position "II", the engine is started, provided that enable 20 was granted.

If the user would like to start the motor vehicle without using key 12, the user can place a finger on fingerprint scanning surface 30 of control element 34. Fingerprint sensor 10 detects corresponding fingerprint signal 11 and compares it to the reference fingerprint signals. If the signals match, the user can start the motor vehicle. For this purpose, control element 34 is moved into position "I", thereby activating the power supply. To start the engine, the user must place control element 34 into position "II".

FIG. 3 shows that control element 34 operates rotary switch shaft 42 of rotary switch 40 via connecting pin 44. Depending on the position of control element 34 (0, I, II), rotary switch 40 emits a corresponding switching signal 18. Due to the mechanical coupling via connecting pin 44, rotary switch coupling 48 can also move. In position "0", a steering wheel lock is also locked, while in position "I" it is unlocked.

A further way to enable the motor vehicle is to use key 12. To do this, the user inserts key 12 into receptacle 36 of control element 34 until locking device 38 engages with recess 28. To start the engine, the user can shift control element 34 from position "0" to position "I" and position "II", respectively, by turning bow 24 of key 12. Driver 26 of key 12 and rotary switch shaft 42 are designed so that they engage in a friction-locked and form-fitted manner. Moving key 12 also moves rotary switch shaft 42. Control element 34 and driver 26 also engage with each other in a friction-locked and form-fitted manner. When key 12 is in receptacle 36, a signal is exchanged inductively between key 12 and signal detector 14 and, if the signal matches a reference key signal, enable signal 20 is emitted, granting unlimited use of the motor vehicle functions. Moving key 12 can also mechanically lock and unlock the steering wheel lock via rotary switch coupling 48.

FIG. 4 provides a further embodiment of the present invention having three fingerprint scanning surfaces 30 and also three fingerprint sensors 10 in control element 34. To release the motor vehicle via fingerprint sensors 10, the user places three fingers on fingerprint scanning surfaces 30. The vehicle is released if one of input fingerprint signals 11 matches a reference fingerprint signal stored in evaluating unit 16. An injured finger, which does not emit a fingerprint signal 11 detected as a valid signal, does not, in this case, cause authorization to be refused. In FIG. 4, fingerprint sensors 10 can be fixedly arranged on control element 34.

FIGS. 5*a*–5*c* provide a further embodiment of the present invention having three fingerprint scanning surfaces 30*a*–30*c*, but only one fingerprint sensor 10. Fingerprint sensor 10 is fixedly arranged opposite control element 34, i.e., fingerprint sensor 10 cannot be moved by control element 34. When the control element is in the position shown in FIG. 5*a* (position "0"), fingerprint sensor 10 inputs fingerprint signal 11 of the finger located on third fingerprint scanning surface 30*c*. Enable signal 20 can be generated as described above. If the user moves control element 34 to the position shown in FIG. 5*b* (position "I"), fingerprint sensor 10 detects the finger located on second fingerprint scanning surface 30*b*. When control element 34 is in the position shown in FIG. 5*c*, the fingerprint of the finger located on first fingerprint scanning surface 30*a* is input and used for authorization release. Release is granted if one of input fingerprint signals 11 matches a reference fingerprint signal stored in evaluating unit 16. Key 12 can be removed from receptacle 36 only in position "0".

Alternative embodiments are possible that allow control element 34 to be moved into positions "I" and "II" only if authorization can be concluded from fingerprint signal 11 or key signal 13. Otherwise, control element 34 may be mechanically locked.

In a further embodiment of control element 34 according to the present invention, electronic power and the "engine on" command are not switched directly by switch 40 via high-current contacts and connections 18, as is the case with conventional ignition locks, but rather by evaluating unit 16 after either key 12 or a fingerprint has been successfully identified. This can provide greater protection against "short-circuiting", i.e., the bridging of contacts 18. Furthermore, the entire unit can be given a smaller, lighter and more economical design.

For situations in which security is less critical, a conventional key bit of key 12 can be used whose mechanical coding replaces transponder 25 for identification purposes. In this case, signal detector 14 can also be omitted.

Fingerprint scanning surface 30 is adjusted to fingerprint sensor 10 used. If fingerprint sensor 10 is based on optical technology, fingerprint scanning surface 30 is permeable to this radiation, for example, by having a transparent design. If fingerprint sensor 10 is capacitive, fingerprint scanning surface 30 is designed to reliably detect changes in capacitance produced by the finger.

What is claimed is:

1. A control device for a motor vehicle, comprising:

a movable control element;

a fingerprint scanning surface;

a fingerprint sensor, the fingerprint sensor detecting a fingerprint as a fingerprint signal via the fingerprint scanning surface, wherein a motor vehicle function is enabled as a function of the fingerprint signal; and a key to enable the motor vehicle function; and a mechanical receptacle for the key, wherein the movable control element includes the fingerprint scanning surface and the mechanical receptacle for the key;

wherein the fingerprint sensor is fixedly arranged opposite the movable control element.

2. The device according to claim 1, further comprising:

a switch, wherein the movable control element has at least one of a rotatable design and movable design for operating the switch.

3. The device according to claim 1, further comprising:

a signal detector to detect a key signal transmitted by the key, the signal detector being integrated into the movable control element.

4. The device according to claim 1, wherein the mechanical key receptacle is at least one of a friction-locked connection and a keyed connection with the key in the mechanical key receptacle, enabling the movable control element to be moved by the key.

5. The device according to claim 1, wherein a further control element is a least one of mechanically locked and unlocked by operating the movable control element.

6. The device according to claim 1, further comprising:

a lock to suppress movement of the movable control element as a function of at least one of the fingerprint signal and the key signal.

7. The device according to claim 1, further comprising:

an evaluating unit associated with the movable control element; and a switch to supply signals to the evaluating unit, wherein depending upon a valid identification of at least one of the key and the fingerprint, the evaluating unit generates control signals for the motor vehicle function that is influenced by the switch.

* * * * *

UNITED STATES PATENT AND TRADEMARK OFFICE

CERTIFICATE OF CORRECTION

PATENT NO. : 6,794,988 B1 
DATED : September 21, 2004
INVENTOR(S) : Karl-Ernst Weiss et al.

It is certified that error appears in the above-identified patent and that said Letters Patent is hereby corrected as shown below:

<u>Column 3</u>,
Line 20, change “24” to -- 34 --.
Line 42, change “30” to -- 10 --.

Signed and Sealed this

Twenty-seventh Day of September, 2005

JON W. DUDAS
*Director of the United States Patent and Trademark Office*